No. 708,701. Patented Sept. 9, 1902.
O. M. EDWARDS.
SHADE ROLLER.
(Application filed Aug. 27, 1900.)
(No Model.) 2 Sheets—Sheet 1.

Witnesses:
Raphaël Netter
Anna E. Newbury

Oliver M. Edwards, Inventor
by Henry L. Newbury, Atty.

THE NORRIS PETERS CO., PHOTO-LITHO., WASHINGTON, D. C.

No. 708,701. Patented Sept. 9, 1902.
O. M. EDWARDS.
SHADE ROLLER.
(Application filed Aug. 27, 1900.)

(No Model.) 2 Sheets—Sheet 2.

Witnesses:
Raphael Netter
George M. Schaefer

Oliver M. Edwards, Inventor
by Henry L. Newbury, Att'y.

UNITED STATES PATENT OFFICE.

OLIVER M. EDWARDS, OF SYRACUSE, NEW YORK.

SHADE-ROLLER.

SPECIFICATION forming part of Letters Patent No. 708,701, dated September 9, 1902.

Application filed August 27, 1900. Serial No. 28,125. (No model.)

*To all whom it may concern:*

Be it known that I, OLIVER M. EDWARDS, a citizen of the United States, residing at Syracuse, county of Onondaga, State of New York, have invented new and useful Improvements in Shade-Rollers, of which the following is a full, clear, and exact description, reference being had to the drawings accompanying and forming a part of the same.

My invention relates generally to spring shade-rollers, and particularly to a class wherein a gravity or other automatically acting pawl or dog is dispensed with—such, for instance, as those shown and described in my pending application, Serial No. 6,543, filed February 26, 1900; and it has for its object to so construct and arrange the parts that they may be cheaply made either by casting or otherwise and also in some cases enable the parts to be differently assembled or combined together; and it consists in certain novel and useful combinations of parts, all of which will be hereinafter fully described, and pointed out in the claims forming a portion of this specification.

Like letters of reference wherever they occur indicate corresponding parts in all the figures.

Figure 1:
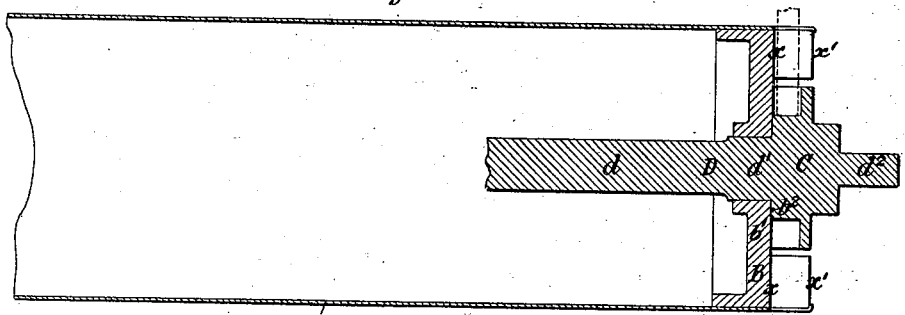
Figure 2:
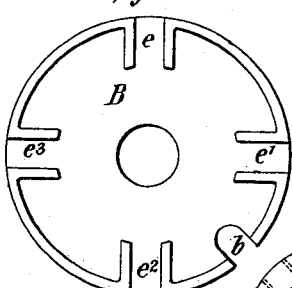
Figure 3:
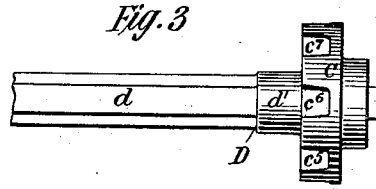
Figure 4:
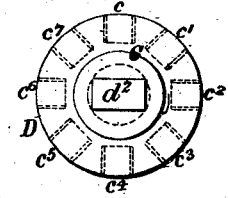
Figure 5:
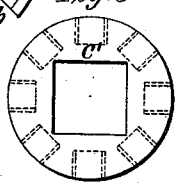
Figure 6:
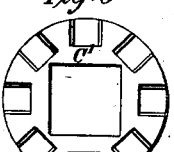
Figure 7:
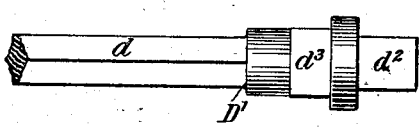
Figure 8:
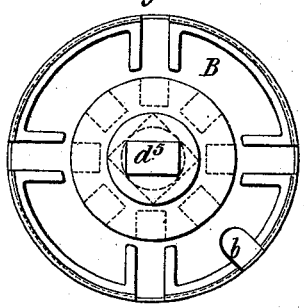
Figure 9:
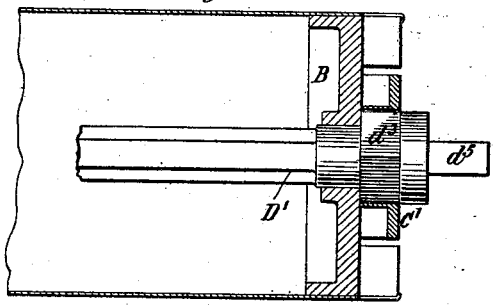
Figure 10:
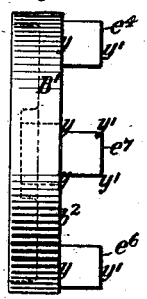
Figure 11:
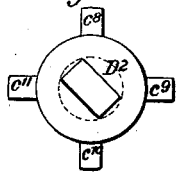
Figure 12:
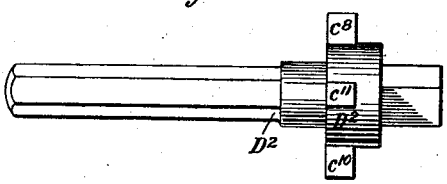
Figure 13:
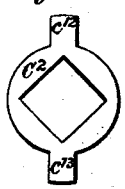
Figure 14:
Figure 15:
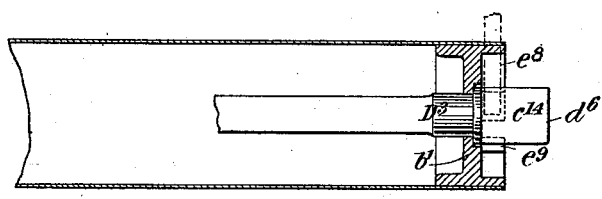
Figure 16:
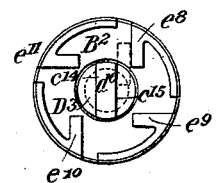
Figure 17:
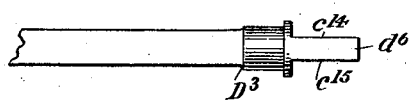
Figure 18:
Figure 19:
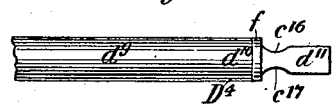
Figure 20:
Figure 21:
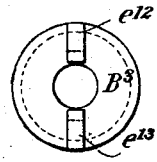
Figure 22:
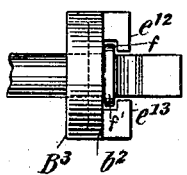

Figure 1 is a longitudinal sectional view of a portion of a spring shade-roller having my improvement in one form applied thereto. Fig. 2 is an end elevation of the barrel-head partly shown in Fig. 1. Fig. 3 is a side elevation of the spindle with the disk formed solid therewith, as shown in Fig. 1. Fig. 4 is an end view of the spindle shown in Fig. 3. Fig. 5 is an end view of a disk formed separate from the spindle proper, with recesses therein, shown in dotted lines, the side-wall surfaces of which form abutting surfaces. Fig. 6 shows the same disk as shown in Fig. 5, but as seen from the opposite side and with the recesses shown in full lines. Fig. 7 shows in side elevation the spindle constructed for use with the disks shown in Figs. 5 and 6. Fig. 8 shows in end view the roller when the disk and spindle are constructed as seen in Figs. 5, 6, and 7. Fig. 9 shows in longitudinal sectional view the roller with the parts constructed as shown in Figs. 5, 6, and 7. Fig. 10 shows in side elevation a modification of the barrel-head seen in Fig. 2. Fig. 11 shows in end view a modified form of the spindle seen in Fig. 4. Fig. 12 shows in side elevation the spindle seen in Fig. 11. Fig. 13 shows in end view a modified form of disk. Fig. 14 shows in edge view the disk shown in Fig. 13. Fig. 15 shows in longitudinal section a modified construction of spring-roller wherein the spindle and its abutting surfaces are formed in one piece. Fig. 16 is an end view of the roller seen in Fig. 15. Fig. 17 shows in side elevation the spindle seen in Figs. 15 and 16, only turned one-quarter of a revolution. Fig. 18 is an end view of the spindle seen in Fig. 17. Fig. 19 shows in side elevation another modification of the spindle. Fig. 20 is an end view of the spindle seen in Fig. 19. Fig. 21 is an end elevation of a modified form of barrel-head. Fig. 22 is a side elevation of the barrel-head shown in Fig. 21 with the spindle seen in Fig. 19 in position therein.

In Fig. 1, A is the barrel of the roller, it being there shown broken off; but it may be of any desired construction or length and provided with the usual form of bearings employed in spring shade-rollers. B is the barrel-head which closes this end of the barrel and forms a finish for this end of the roller in a well-known manner, and through which the spindle D may pass from the exterior to the interior of the barrel and form a bearing on which the barrel may revolve in a customary manner. As here shown, the spindle consists of its body portion $d$, the bearing portion $d'$, on which the barrel revolves, its disk portion C, and its flattened end portion $d^2$, adapted to be received in a bracket in a well-known way and be held from turning therein. The barrel-head B is provided with any desired number of recesses extending from its periphery toward the axial line of the roller, four, $e$, $e'$, $e^2$, and $e^3$, being shown in the drawings, each one of which, by means of one of its side walls, forms an abutting surface against which a pin or other device may abut and prevent the further rotation of the barrel in one direction. The other side wall of each recess may likewise serve as an abutting surface if the barrel is revolved in the other direction—as, for instance, backwardly. These recesses, with their side walls, are formed so as to be open at one side of the barrel-head or at the end of the roller, as seen in Figs. 1 and 2, and they may be formed as there seen or otherwise, so long as they have open sides or portions in the direction of the axial line of the head when it is assembled in the roller. These side walls or portions of the recesses, as from $x$ to $x'$ of Fig. 1, extend in lines substantially parallel with the axial line of the barrel-head. The abutting surfaces formed by the side surfaces of these recesses are arranged substantially radial to the axis of the roller and, as shown, are open or accessible from the end or side of the roller. The portion of the barrel-head in which these recesses are formed may be skeletonized, as shown in the drawings, or otherwise shaped, as the constructor desires. Instead of forming recesses in the barrel-head, which in turn form abutting surfaces, four abutting surfaces may be formed, three of which, $e^4$, $e^6$, and $e^7$, are shown in Fig. 10, (the fourth surface is not seen, as it is behind the projection on which the surface $e^7$ is formed,) wherein projections extend from the barrel-head $B'$, and the side walls of these projections serve as abutting surfaces the same as the side walls of the recesses shown in Fig. 2. The side-wall surfaces, as from $y$ to $y'$, Fig. 10, of these projections may, if desired, be arranged in lines substantially parallel with the axial line of rotation of the barrel-head, or projections $e^8$, $e^9$, $e^{10}$, and $e^{11}$ may be formed on the barrel-head $B^2$, as shown in Figs. 15 and 16, the side-wall surfaces of which may also, if desired, be arranged substantially radial to the axis of the roller and be open or accessible from the end of the roller, as before explained. The construction shown in Figs. 15 to 18, inclusive, may, if desired, be used with the barrels of the smaller sizes of this class of rollers, and also where the thing to be supported or moved is of comparatively light weight.

Instead of forming the barrel-head with projections as shown in Figs. 15 and 16, it may be formed as shown in Figs. 21 and 22, wherein the barrel-head $B^3$ has two projections $e^{12}$ and $e^{13}$, which are preferably undercut to permit the flanges $f$ and $f'$ on spindle $D^4$ to rotate, these flanges when the spindle is assembled in the barrel-head escaping the projections $e^{12}$ and $e^{13}$, owing to the flattened sides between such flanges passing down between the projections. The abutting surfaces of these projections $e^{12}$ and $e^{13}$ are also, as shown, arranged substantially radial to the axis of the roller and are open or accessible from the end of the roller, and are also substantially parallel with the axial line of rotation of the spindle and barrel-head, as in some of the previous constructions referred to. If desired, the projections $e^{12}$ and $e^{13}$ need not come so near to the spindle as here shown, and the flanges $f$ and $f'$ may extend and form one continuous flange clear around the spindle. These barrel-heads may be provided with the usual bearing for the spindle and recess $b$ in their peripheries to receive the end of the material to be secured to the roller or be formed for any other kind of securing means by which the shade or other flexible material is to be secured to the roller, as such securing means form no necessary part of my improvement. The spindle D also may have in its disk portion C any desired number of recesses formed, as here shown there being eight, $c$, $c'$, $c^2$, $c^3$, $c^4$, $c^5$, $c^6$, and $c^7$, the side walls of which, like those of the recesses in the barrel-head, forming abutting surfaces. These recesses in the disk portion C of the spindle may have their side-wall surfaces formed somewhat tapering, as here shown, or in any other manner, so long as they are so formed or shaped as to have their side-wall or abutting surfaces extend to the exterior of the spindle in at least two directions, one at an angle to the other, as here shown, where such surfaces are arranged radially in one direction and substantially parallel to the line of rotation of the spindle in the other direction. Instead of forming recesses in the disk portion C of the spindle, as shown in Figs. 1, 3, and 4, such disk portion may be formed as shown in end view in Fig. 11 and in side elevation in Fig. 12, wherein projections $c^8$, $c^9$, $c^{10}$, and $c^{11}$ extend bodily from the spindle $D^2$ and their side-wall surfaces or portions form abutting surfaces. In this case also the side-wall surfaces or side portions extend to the exterior of the spindle in two directions and are arranged in lines substantially parallel with the axial line of rotation of the spindle, or, if desired, the recesses shown in Figs. 1, 3, and 4 may have their open sides placed opposite to those shown, being in full lines where now seen in dotted lines in Fig. 4. The barrel-head and spindle when thus formed may be assembled in the barrel of the roller in any of the well-known ways, with the barrel and spindle spring-connected one with the other, as is customary in this class of rollers, the manner of so connecting them or the assembling of the parts being immaterial so long as the abutting surfaces on the barrel-head and spindle are adapted to serve their intended purposes. It will be manifest that if a pin or device be inserted in any one of these recesses in the barrel-head and in any one of these recesses in the spindle-disk, as indicated in dotted lines in Figs. 1 and 16, the spindle and barrel-head will be temporarily locked together until such pin or device is removed, and the roller when the parts are so locked can be removed from its supporting-brackets and the tension or stress of the spring be adjusted by the removal of such pin, the winding up or unwinding of the spring and the replacing of the pin in some one of the recesses in the head and of the spindle, when the roller can be replaced in its brackets again. It is manifest so long as an abutting surface on the barrel-head is open or accessible from the end of the roller that the pin or device can be manually inserted between such abutting surface and an abutting surface on the spindle by passing such device into engaging position from the end of the roller, as access is given to both surfaces for the device or pin to enter between them in this general direction by reason of the abutting surface on the barrel-head being thus open or accessible from the end of the roller. This is also true where an abutting surface on the spindle is open or accessible from the end of the roller, as is the case with the constructions shown in Figs. 11 to 22, inclusive, whether or not the abutting surface on the barrel-head be open or accessible from the side of the roller, because access may be given to the two surfaces for the pin or device to enter between them by reason of the abutting surface on the spindle alone being open or accessible from the end of the roller, or by reason of an abutting surface on the spindle and one on the head being both open or accessible from the end of the roller. If the abutting surface on the barrel-head be open or accessible from the side of the roller and the surface of the spindle be open or accessible from the end of the roller, then accesss is given to both surfaces from either the side or end of the roller. This is also true when the abutting surface on the barrel-head is open or accessible from the end of the roller in addition to being open or accessible from the side of the roller.

Instead of forming the spindle with a disk portion, as just described, it may in some cases—for instance, when the roller is of small diameter and the spring is comparatively weak—be made without such disk portion, as seen in Figs. 15 to 20. In Figs. 15 to 18 the flattened end $d^6$ of spindle $D^3$ is shown as continued inward toward the barrel-head, so as to enable the flattened sides $c^{14}$ and $c^{15}$ of such end $d^6$ within the barrel-head to serve as abutting surfaces. As seen in Figs. 15 and 16, these flattened sides $c^{14}$ and $c^{15}$ of this spindle $D^3$ may pass the projections $e^8$, $e^9$, $e^{10}$, and $e^{11}$ in such relation thereto that a pin or device placed in position between either flattened side and either projection will temporarily lock the spindle and barrel-head together the same as in the case with the parts constructed as seen in Figs. 1 to 4. As seen in Figs. 15 and 16, such pin or device may be inserted in either one of two directions, one of which is therein indicated in dotted lines, which is in some instances an advantage. These abutting surfaces $c^{14}$ and $c^{15}$ extend in two directions toward the exterior of the spindle and are arranged in lines substantially parallel with the line of axial rotation of the spindle, as before explained. Also instead of forming the spindle as before described it may be formed as seen in Figs. 19 and 20, wherein the bearing $d^{10}$ of spindle $D^4$ is of substantially the same size as the body portion $d^9$, and preferably with flanges $f$ and $f'$ on opposite sides of such bearing $d^{10}$, formed to hold the spindle from passing through the bearing in the barrel-head in one direction, the spring, in a well-known manner, holding the spindle in place in such head in the other direction. The parallel sides between the flanges $f$ and $f'$ permit the spindle to be properly placed in the barrel-head, and the under-cut portions of projections $e^{12}$ and $e^{13}$, as seen in Fig. 22, permit the flanges to pass the projections when the spindle and head rotatively move relatively to each other. Between the flattened end $d^{11}$ and the flanges $f$ and $f'$ of this spindle $D^4$ curved abutting surfaces $c^{16}$ and $c^{17}$, substantially equidistant apart, are formed, as shown in Fig. 19, which surfaces coact with the abutting surfaces on the projections $e^{12}$ and $e^{13}$, the same as those on the spindle and barrel-head heretofore described coact when a pin or similar acting device is introduced between one surface on the spindle and one on the head to lock the spindle and head together when adjusting the tension or stress of the spring and in removing the roller from or in placing it in its brackets.

It will be observed that the curved abutting surfaces $c^{16}$ and $c^{17}$ are not arranged in lines substantially parallel with the axial line of rotation of the spindle; but they are so arranged that the pin or device to be inserted between the abutting surface on the barrel-head and that on the spindle can be inserted between such surfaces when the spindle and head are assembled in the roller from either the periphery of the head or endwise of the roller and that these directions are at an angle to each other.

Instead of forming the disk portion of the spindle integral with the rest of the spindle, as seen in Figs. 1, 3, and 4, such disk portion may be formed of a separate piece of material, as C′, as seen in Figs. 5 and 6, with an opening through it of suitable shape—as, for instance, rectangular, as shown—to receive the spindle at $d^3$ and be locked thereto, the spindle at this point being made of corresponding shape, as seen in Figs. 7 and 9, to prevent the disk turning on the spindle to any material extent. The shape and size of the spindle and of the opening through the disk are immaterial so long as the disk C′ is received on the spindle and held or locked from turning thereon. Any desired means may be employed to hold the disk endwise of the spindle. As here shown, the spindle is provided with a small shoulder to hold the disk in one direction endwise on the spindle, and the barrel-head holds it in the other direction. Instead of forming the disk of the shape shown in Figs. 5 and 6 and with recesses, as there shown, it may be formed as in Figs. 13 and 14, wherein the disk C² is provided with two projections extending bodily from the disk. The projections $c^{12}$ and $c^{13}$ may have their side-wall surfaces, as from $z$ to $z'$, arranged in lines substantially parallel with the axial line of rotation of the disk and roller. These abutting or side-wall surfaces extend to the exterior of the spindle in two directions, as heretofore explained, and thereby afford an opportunity to insert a pin or device between the abutting surface on the barrel-head and that on the spindle when the head and spindle are assembled in the roller from either the periphery of the head or endwise of the roller, one of which directions is at an angle to the other. The disk, as here shown, is provided with an opening of substantially the same size all the way through it, so that the disk C' is adapted to be placed on the spindle D' in either one of two positions—that is, the disk may be placed on the spindle with the side seen in Fig. 5 toward the flattened end $d^5$ of the spindle, as shown in Figs. 8 and 9, or with the side seen in Fig. 6 toward such end, as desired. The disk portions when made separate from the spindle as well as when made integral therewith may be provided with any number of abutting surfaces desired, and they may be formed as shown in Figs. 3, 5, and 6 or as such surfaces are formed in Figs. 11, 12, 13, and 14 or in any desired way, so long as they are adapted to serve the functions served by those shown. The formation of the disks C' and $C^2$ separate from the spindle is advantageous, as it permits of their being assembled in the roller in different positions relatively thereto and also facilitates their manufacture. The abutting surfaces in all of the embodiments of the invention herein shown are fixed or stationary relatively to the barrel-head and spindle, and the abutting surface or surfaces on the head are arranged relatively to the abutting surface or surfaces on the spindle, so that those on the head pass near to or in somewhat close proximity to those on the spindle, or vice versa. It is preferable to have the surface or surfaces on the head pass as close to the surface or surfaces on the spindle as they can without touching each other; but there may be more or less space between the surfaces as they pass each other, so long as the pin or device to be manually inserted between them is of suitable size and shape to adapt it to effectually lock the spindle and barrel-head together.

The term "shade-roller" as herein used refers to a class of spring-rollers used for lifting, counterbalancing, or suspending some object—such, for instance, as a window-sash, curtain, or other object—which may be more or less controlled by a web or other flexible material being wound upon the roller and unwound therefrom in a manner somewhat similar to that in which shade-rollers may so wind and unwind flexible material.

It is to be observed that whenever either the barrel-head or the spindle is provided with a plurality of abutting surfaces an entire revolution of one relatively to the other is not required to adjust or change the tension or stress of the spring of the roller. The same result is produced—that is, a finer adjustment of the tension of this spring—whether the barrel-head alone be provided with a plurality of abutting surfaces and the spindle with a single abutting surface or the spindle alone be provided with a plurality of abutting surfaces and the barrel-head with a single abutting surface, and this is true whether the surface or surfaces on the barrel-head are alone open or accessible from the end of the roller or whether the surface or surfaces on the spindle be or be not thus open or accessible, and also whether or not the abutting surface or surfaces on the barrel-head are open or accessible from the periphery of the roller or such surface or surfaces are arranged substantially parallel with the axis of the roller or substantially radial to such axis, so long as access is given to a surface on the barrel-head or on the spindle and more than one surface on the other one of these two—barrel-head and spindle. It is also to be observed that in giving access to the surface or surfaces on the barrel-head alone from the end of the roller access may also be given to the surface or surfaces on the spindle, and also that in giving access to the surface or surfaces on the spindle from this general direction access may many times be given to the surface or surfaces on the barrel-head for a device to be manually inserted from other directions than at right angles to axis of the roller, as is clearly seen in different figures of the drawings. Therefore the particular direction in which such device is to be inserted between a surface on the barrel-head and a surface on the spindle is immaterial so long as it is inserted in abutting engagement between the two and lock the head and spindle temporarily together for the purpose heretofore described.

What I desire to claim is—

1. In a shade-roller the combination, substantially as set forth, of a barrel-head provided with an abutting surface arranged substantially radial to the axis and open or accessible from the end of the roller and a spindle provided with an abutting surface, which is arranged relatively to the surface on the barrel-head to abut against a device manually inserted between the two from the end of the roller.

2. In a shade-roller the combination, substantially as set forth, of a barrel-head and a spindle one of which is provided with an abutting surface and the other is provided with a plurality of abutting surfaces, whichever is on the barrel-head being arranged substantially radial to the axis and open or accessible from the end of the roller, with the surfaces on the head and spindle arranged relatively to each other to abut against a device manually inserted between a surface on the spindle and a surface on the head from the end of the roller.

3. In a shade-roller the combination, substantially as set forth, of a barrel-head provided with an abutting surface open or accessible from both the side and the end of the roller, and a spindle also provided with an abutting surface, the surface on the head being arranged relatively to the surface on the spindle to abut against a device manually inserted between the surface on the head and the surface on the spindle.

4. In a shade-roller the combination, substantially as set forth, of a barrel-head provided with an abutting surface open or accessible from the end of the roller, and a spindle also provided with an abutting surface, the surface on the head being arranged to pass near to the surface on the spindle, such surfaces being so constructed and arranged as to adapt them to abut against a device manually inserted between them from the end of the roller.

5. In a shade-roller the combination, substantially as set forth, of a barrel-head and a spindle each of which is provided with an abutting surface, one of which surfaces is arranged substantially parallel with the axial line of rotation of the head and spindle and is open or accessible from the end of the roller, the two surfaces being arranged to abut against a device manually inserted between them, from the end of the roller.

6. In a shade-roller the combination, substantially as set forth, of a barrel-head and a spindle each of which is provided with a plurality of abutting surfaces arranged substantially parallel with the axial line of rotation of the head and spindle and open or accessible from the end of the roller, the surfaces on one being arranged relatively to the surfaces on the other to abut against a device manually inserted between them from the end of the roller.

7. In a shade-roller the combination, substantially as set forth, of a barrel-head provided with a recess having one open end and one open side, and a spindle provided with a recess having one open end, the open end of the recess in the head being arranged to pass near to the open end of the recess in the spindle, the side-wall surface of the recess in the head being arranged substantially parallel with the axial line of rotation of the head, portions of such surface and of the recess in the spindle being adapted to abut against a device manually inserted between them from the open side of the recess in the head.

8. In a shade-roller the combination, substantially as set forth, of a barrel-head provided with a recess having open ends and one open side and a spindle provided with a recess having one open end and one open side, the open end of the recess in the spindle being arranged to pass near one of the open ends of the recess in the barrel-head, the side-wall surfaces of both of the recesses being arranged substantially parallel with the axial line of rotation of the head and spindle and portions of such surfaces being adapted to abut against a device manually inserted between them.

9. In a shade-roller the combination, substantially as set forth, of a barrel-head provided with an abutting surface and a spindle provided with a plurality of abutting surfaces, the surface on the head or the surfaces on the spindle being open or accessible from the end of the roller and arranged relatively to the other surface or surfaces to abut against a device manually inserted from the end of the roller between any abutting surface on the spindle and the abutting surface of the head.

10. In a shade-roller the combination, substantially as set forth, of a barrel-head provided with a plurality of abutting surfaces each of which is open or accessible from both the side and the end of the roller, and a spindle provided with a plurality of abutting surfaces which are arranged relatively to the surfaces on the barrel-head to abut against a device manually inserted between any abutting surface on the barrel-head and any abutting surface on the spindle.

11. In a shade-roller the combination, substantially as set forth, of a barrel-head provided with an abutting surface and a spindle provided with a plurality of recesses having one open end and one open side, the side-wall surfaces of the recesses being arranged substantially parallel with the axial line of rotation of the spindle and are adapted to abut against a device manually inserted between the side wall of any recess in the spindle and the abutting surface on the barrel-head.

12. In a shade-roller the combination, substantially as set forth, of a barrel-head provided with an abutting surface, a spindle adapted to be received by the barrel-head and to receive a disk, and a disk made separable from the spindle and provided with oppositely-arranged abutting surfaces and an opening through the disk of suitable shape to receive the spindle and be locked thereto in opposite directions, one of the oppositely-arranged abutting surfaces on the disk forming the operative abutting surface when the disk is placed on the spindle in one direction and the opposite surface thus forming it when the disk is placed on the spindle in the other direction, the abutting surfaces on the disk and barrel-head being arranged to pass near to each other and adapted to abut agaiut a device manually inserted between them.

13. In a shade-roller the combination, substantially as set forth, of a barrel-head provided with an abutting surface, a spindle adapted to be received by the head and to receive a disk, and a disk made separable from the spindle and provided with an opening through it of suitable shape to receive the spindle and be locked thereto in opposite directions and also provided with a recess having one open end and one open side, the side-wall surfaces of the recess being arranged substantially parallel with the axial line of rotation of the spindle, one side-wall surface forming the abutting surface when the disk is placed on the spindle in one direction and the opposite surface thus forming it, when the disk is placed on the spindle in the other direction, the abutting surfaces of the recess in the spindle and the abutting surface on the head being adapted to abut against a device manually inserted between them.

14. In a shade-roller the combination, substantially as set forth, of a barrel-head provided with an abutting surface, a spindle adapted to be received by the barrel-head and to receive a disk, and a disk made separable from the spindle and provided with a recess having one open and one closed side and an open end and also provided with an opening through it of suitable shape to receive the spindle and be locked thereto, the open end of the recess in the disk being arranged to pass near the abutting surface on the barrel-head and the two adapted to abut against a device manually inserted between them.

15. In a shade-roller the combination, substantially as set forth, of a barrel-head provided with an abutting surface, a spindle adapted to be received by the barrel-head and to receive a disk, and a disk made separable from the spindle and provided with a plurality of recesses having one open and one closed side and an open end and also provided with an opening through it to receive the spindle and be locked thereto, the open end of the recess in the disk being arranged to pass near to the abutting surface on the barrel-head, and the two adapted to abut against a device manually inserted between them.

16. In a shade-roller the combination, substantially as set forth, of a barrel-head provided with an abutting surface, a spindle adapted to be received by the barrel-head and to receive a disk, and a disk made separable from the spindle and provided with a plurality of recesses having one open and one closed side and an open end and also provided with an opening through it to receive the spindle and be locked thereto, the open ends of the recesses in the disk being arranged to pass near to the abutting surface on the barrel-head and the side-wall surfaces of the recesses arranged substantially parallel with the axial line of rotation of the spindle, the abutting surface on the head and the side-wall surface of any recess in the disk being adapted to abut against a device manually inserted between them.

17. In a shade-roller, the combination, substantially as set forth, of a barrel-head provided with a plurality of recesses having two open ends and one open side, a spindle adapted to be received by the barrel-head and to receive a disk, and a disk made separable from the spindle and provided with a plurality of recesses having one open and one closed side and an open end, the disk being provided with an opening through it of suitable shape to receive the spindle from opposite directions and be locked thereto, the open ends of the recesses in the disk being arranged to pass near the recesses in the barrel-head and the side-wall surface of one recess in the disk and the side-wall surface of any recess in the head are adapted to abut against a device manually inserted between them.

OLIVER M. EDWARDS.

Witnesses:
F. C. EDDY,
A. C. LEYDEN.